United States Patent [19]

Borkar

[11] Patent Number: 5,047,922

[45] Date of Patent: Sep. 10, 1991

[54] VIRTUAL I/O

[75] Inventor: Shekhar Borkar, Portland, Oreg.

[73] Assignee: Intel Corporation, Santa Claraa, Calif.

[21] Appl. No.: 559,976

[22] Filed: Jul. 27, 1990

Related U.S. Application Data

[63] Continuation of SN. 150,740, Feb. 1, 1988 abandoned.

[51] Int. Cl.$^5$ .............................................. G06F 13/00
[52] U.S. Cl. .............................. 364/200; 364/245.6; 364/241.9; 364/232.1; 364/238
[58] Field of Search ... 364/200 MS File, 900 MS File

[56]  References Cited

U.S. PATENT DOCUMENTS

| | | | |
|---|---|---|---|
| 3,639,909 | 2/1972 | Hauck et al. | 364/200 |
| 4,340,775 | 7/1982 | Gesek et al. | 178/3 |
| 4,340,776 | 7/1982 | Ganz et al. | 178/3 |
| 4,453,211 | 6/1984 | Askinazi et al. | 364/200 |
| 4,471,458 | 9/1984 | Weilbacker et al. | 364/200 |
| 4,707,803 | 11/1987 | Anthony, Jr. et al. | 364/900 |
| 4,835,769 | 5/1989 | Donaghue, Jr. et al. | 370/85.1 |
| 4,839,795 | 6/1989 | Iwaksaki | 364/200 |

Primary Examiner—Michael R. Fleming
Assistant Examiner—Gopal C. Ray
Attorney, Agent, or Firm—Blakely, Sokoloff, Taylor & Zafman

[57]  ABSTRACT

A method and apparatus are disclosed for coupling external, bidirectional ports to an onboard port of a single chip microprocessor such that the external ports can be addressed in the same manner as onboard ports. Using the disclosed method and apparatus, external ports, which are referred to herein as virtual ports, a single onboard port may be configured that it can be used to address up to twelve virtual ports. The port is used as a multiplexed bus to communicate with the virtual ports. Read (RD) and write (WR) signals are used to perform read and write operations on the virtual ports.

5 Claims, 5 Drawing Sheets

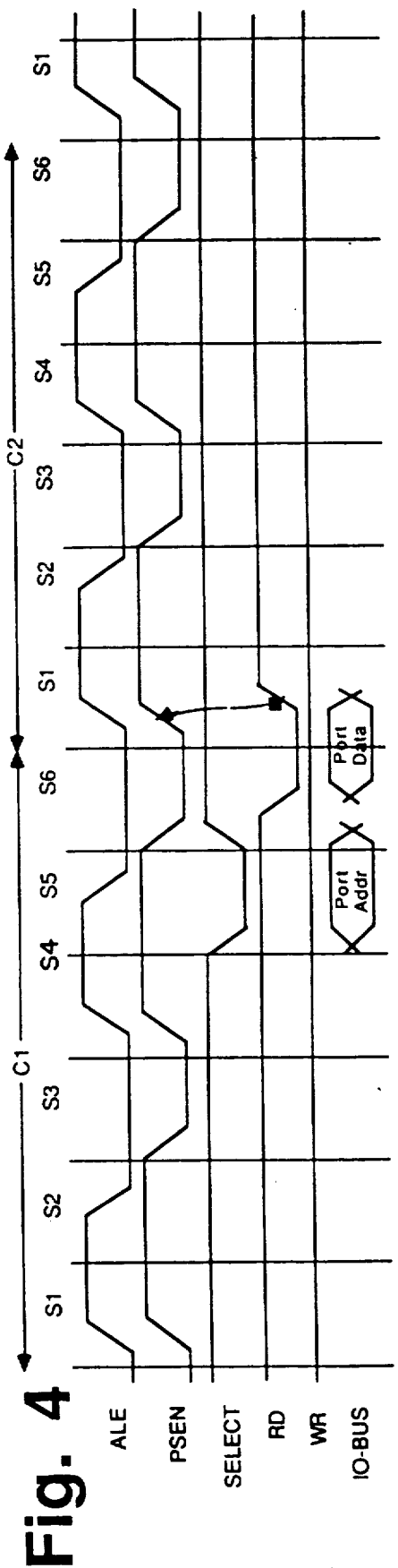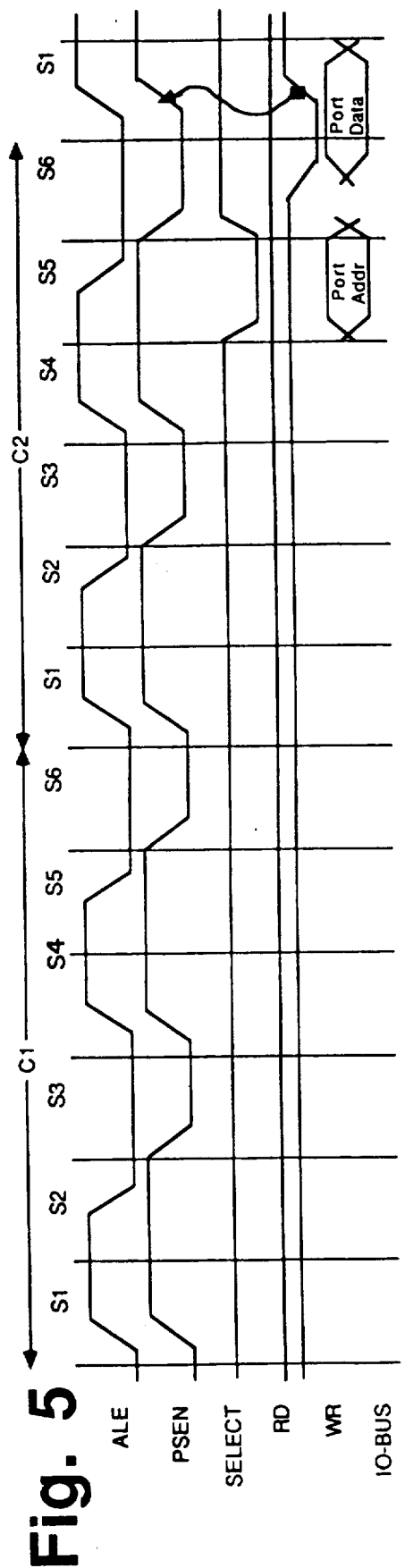

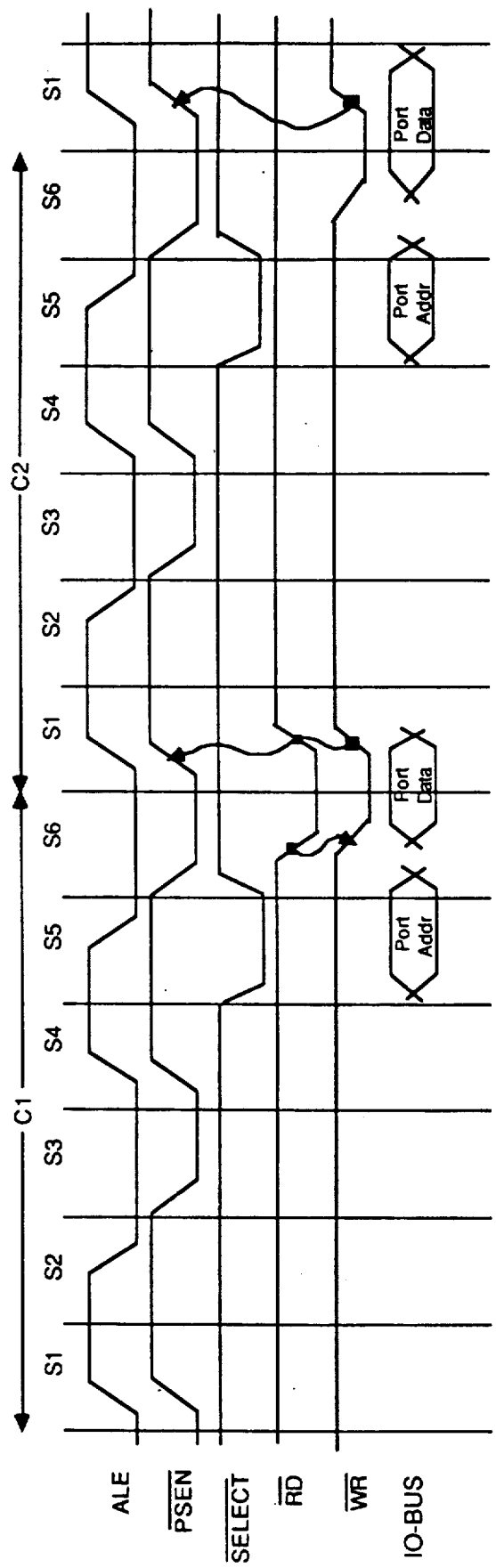

VIRTUAL I/O

This is a continuation of application Ser. No. 150,740 filed Feb. 1, 1988 now abandoned.

BACKGROUND OF THE INVENTION

1. Field Of The Invention

This invention relates to the field of single chip microprocessors and controllers. In particular, this invention relates to the utilization of input and output ports connected to the system bus of a microprocessor or controller for reading data from and writing data to external devices.

2. Prior Art

The use of input/output ports for providing communications between a microprocessor and external devices is well known. For example,: the Intel 8051 microcontroller provides for bidirectional ports, each consisting of a latch register, an output driver and an input buffer, each port being 8-bits wide.

During output operations, and assuming that one of the ports has been selected, data from the bus is placed into the latch register for the selected port. Once this occurs, the output driver of the selected port transfers the data stored in the latch register to the selected output device. Similarly, when reading data from an external device, the data from the device being read is placed on the pins of the selected port and loaded into the port input buffer, and then placed onto the internal system bus. In this input mode of operation, the data which is placed on the system bus is the data which is on the pins rather than the data stored in the latch register.

There is a third mode of operation, called read-modify-write mode. In this mode of operation, the data is read from the latch register, instead of the pins. The desired operation is performed and the results are written into the latch register for output on the pins. This entire operation is performed by a single instruction.

Generally, ports are written to or read from by the processor addressing particular locations in an on-chip RAM, which includes locations which are mapped onto the ports. In the prior art, in a fully configured system, with a 40 pin or 48 pin processor chip, there cannot be more than one or two ports available for communicating with external devices. (For example, utilizing a 40 pin processor chip with four ports, each 8-bit port requires 8 pin-outs for a total of 32 pins leaving only 8 pins for clock signals, control signals and power.) After 64K external program and data memories are coupled to the ports, generally only one port would be left to communicate with external devices. To overcome this problem, the prior art coupled a port expander to one of the ports. However, this technique has the disadvantage of causing a slow down in processor speed. That is, with a port expander, to read from or write to a device, at least two instructions must be executed, one to tell the port expander which real external port is being addressed, and a second instruction to actually move the data to or from the external port.

Another method of adding more input/output ports is to map them into the external memory by reserving a few external memory locations for the I/O ports. To the microcontroller and the program, these external ports look as if they are part of the external memory. The program may read from an input port as if it is a memory location. Similarly it can write to an output port as if it is a memory location. However, memory mapped I/O has the following disadvantages:

1. The hardware required to decode external memory addresses and control the external ports, is non trivial. The decoder consists of many logic gates. This logic occupies a lot of board space in a system, increases power consumption, and thus its overall cost.
2. The ports are configured in the hardware as inputs and outputs and cannot be reconfigured under software control.
3. A read-modify-write functionality cannot be externally reproduced because a memory mapped port cannot be made bidirectional.
4. The external ports cannot be made bit addressable.
5. External memory accesses are slower than internal register accesses. Since the ports are memory mapped, external memory instructions are used to access them. These instructions take longer to execute. Also more instructions are required to perform the same operations. Thus, the program increases in size and decreases in performance.

To overcome the foregoing problems, the subject invention is directed to a method and apparatus for coupling external ports to an onboard port so that the external ports can be addressed the same as onboard ports, in effect creating virtual ports.

SUMMARY OF THE INVENTION

A method and apparatus are disclosed for coupling external, bidirectional ports to an onboard port of a single chip microprocessor such that the external ports can be addressed in the same manner as onboard ports. Using the disclosed method and apparatus, external ports, which are referred to herein as virtual ports, a single onboard port may be configured that it can be used to address up to twelve virtual ports. The onboard port is used as a multiplexed bus to communicate with the virtual ports. Read (RD) and write (WR) signals are used to perform read and write operations on the virtual ports.

Functionally, the virtual ports behave as if they are internal to the microprocessor. However, the port "select" and "data" signals are latched by external hardware. When the processor is directed to access virtual port addresses, it automatically initiates proper control signals to perform read/write operations on the selected virtual port.

Virtual input/output ("VIO") offers the following advantages:

Since the number of virtual ports is not fixed in the chip, it is possible to configure as many virtual ports as desired. The cost is not built into the chip.

Although instruction execution time is doubled for VIO, a single instruction is required to access it. As contrasted with prior art methods, where multiple instructions are needed, the overall speed of execution is faster using VIO.

Since no extra instructions are needed, the code density is not affected. In the prior art, more than one instruction is required, increasing the size of code.

The additional hardware needed to support VIO is simple and inexpensive compared to prior art techniques.

Quasi-bidirectional ports with read-modify-write functionality is available in virtual ports. It is not available using prior art techniques.

Since the number of instructions remains the same, a previously written program does not change with VIO.

BRIEF DESCRIPTION OF THE DRAWINGS

FIG. 4 is a timing diagram for virtual I/O port read operation.

FIG. 5 is a timing diagram for virtual I/O port write operation.

FIG. 6 is a timing diagram for virtual I/O port read-modify-write operation.

DETAILED DESCRIPTION OF THE INVENTION

A method and apparatus is disclosed for implementing virtual input/output ports in a single chip microprocessor. Specific numbers of bytes, bits, registers, addresses, clock signals, control signals, etc. have been set forth for purposes for explanation in order to provide a thorough understanding of the invention. However, it should be apparent to one skilled in the art that the present invention may be practiced without these specific details. In other instances, well known circuits and devices are shown in block diagram form in order not to obscure the present invention unnecessarily.

In order to simplify the understanding of the invention, rather than describing the invention in abstract terms, many of the descriptions herein are in terms of a specific processor, namely the Intel 8051 microcontroller as specified in a publication entitled "Microcontroller Handbook," Order No. 210918-004 available from Intel Corporation, Santa Clara, California. However, it should be understood that the invention is not limited for use by any specific processor.

Figure 1:
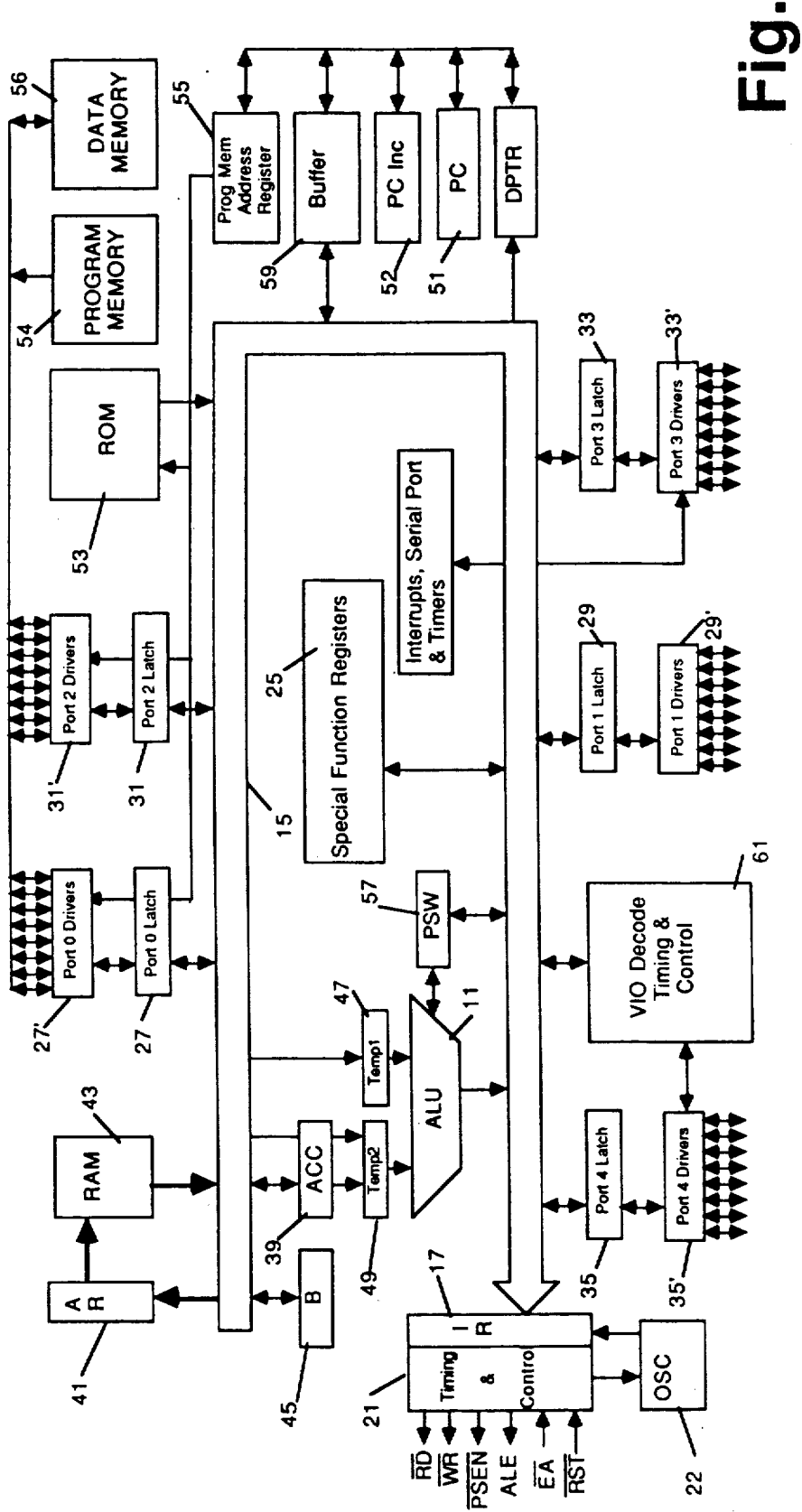
FIG. 1 is a block diagram showing the main elements of a single chip microprocessor with five onboard ports, wherein one port is used to support virtual I/O ports.

Referring now to FIG. 1, the main components of a microprocessor with five onboard ports is shown. The microprocessor comprises an arithmetic/logical unit (ALU) 11, a system bus 15, an instruction register (IR) 17, timing and control logic 21, oscillator (OSC) 22, special function register area (SFR) 25, latch registers 27, 29, 31, 33 and 35 and input buffers/output drivers 27', 29', 31', 33', 35' corresponding respectively to ports P0, P1, P2, P3 and P4. Also shown are accumulator (ACC) 39, address register (AR) 41, random access memory (RAM) 43, additional registers B, Temp1, and Temp2 45, 47 and 49, program counter (PC) 51, PC incrementer 52, ROM 53, program memory address register 55, program status word (PSW) register 57, and buffer 59, all of which are well known in the art and usually needed for proper operation of a single chip microprocessor or controller. The particular manner in which these elements are coupled to each other and operate, as well as additional components, depends upon the particular architecture utilized, which details will be described herein only to the extent necessary for a complete understanding of the invention.

Coupled to ports P0 and P2 through a 16 bit address/data multiplexed bus are external program memory 54 and external data memory 56. Timing and control signals for the two external memories as well as for the virtual ports are generated through port P3. The 64K program memory contains processor instructions of the usual type. Data to be manipulated by the microprocessor is stored either in internal data memory 43, or in external data memory 56. Details regarding the accessing and loading of instructions from the program memory and manipulating data in the data memory are well known in the art and therefore, except to the extent necessary for a proper understanding of the subject invention, will not be described.

Although not part of the invention, the following discussion of 8051 microarchitecture is provided so that the invention may be better understood.

The 8051 clock is internally divided to generate two non-overlapping phases. One phase is equal to one external clock cycle. Two phases, called Ph1 and Ph2, constitute a "State". One state is equal to two external clocks. Six states make a "Cycle". The states, within a cycle, are numbered from 1 to 6; i.e. S1, S2.. S6. The cycles are numbered from 1 to 4; i.e. C1, C2, C3, C4. Instructions execute in integer multiples of cycles. Most of the instructions take one or two cycles to execute.

Timing and control logic 21 of the CPU accesses SFR registers as follows. The 8 bit address of a SFR register 25 is specified in the second byte of the instruction. This byte is available on internal bus 15 during Ph2 of S4. Control logic 21 asserts a signal SFR-Addr indicating that the address on bus 15 matches that of one of the SFR registers This information is stored for the duration of the instruction execution. In the next state, S5, control logic 21 asserts a read signal RD. The contents of the addressed SFR register is placed on internal bus 15, for storage into one of the temporary registers 47 and 49 of ALU 11. In the following state, S6, ALU 11 performs an arithmetic/logical operation on the data and places the results on internal bus 15. This modified data is latched into the addressed SFR register.

In short, the address of a SFR is made available in S4. The selected register is read in S5. And finally the data is written into the SFR in S6. In the case of two cycle instructions, the same steps are followed, but in different cycles.

Virtual I/O (VIO) is a method and apparatus for mapping external I/O ports to the internal register space of a microprocessor or microcontroller, which in the case of the 8051 microcontroller, is the SFR area 25. To the software, the ports look as if they are internal to the chip. But in reality, VIO hardware routes data to/from the external port, and generates necessary external control signals for the external I/O ports created using hardware. The externally created ports look similar to internal ports and have latch registers, input buffers, and output drivers. In this connection, to implement VIO, a VIO decode timing and control block 61 is added to the basic microcontroller shown in FIG. 1 and various modifications are made to timing and control logic 21 as described in detail below.

The Intel 8051 family of microcontrollers allows up to 128 SFR registers which re used as internal control and status registers, although only a few are used. The onboard I/O ports P0-P4 are addressed through this register space. The instructions which read, write, read-modify-write, and bit manipulate the SFRs, including the virtual I/O ports according to the present invention, belong to the SFR space. Inasmuch as the same instructions can be used on the virtual I/O ports, to the software, it does not appear that the virtual ports actually reside out of the chip.

The VIO hardware is implemented in the microcontroller i.e., in the chip itself, and will be described with reference to FIG. 3. However, the actual I/O ports are built externally, using discrete hardware blocks. To create a virtual port, the basic elements of an internal (i.e., on the chip) I/O port—such as port latches, port drivers, and data buffers—are created externally using logic elements.

Figure 2:
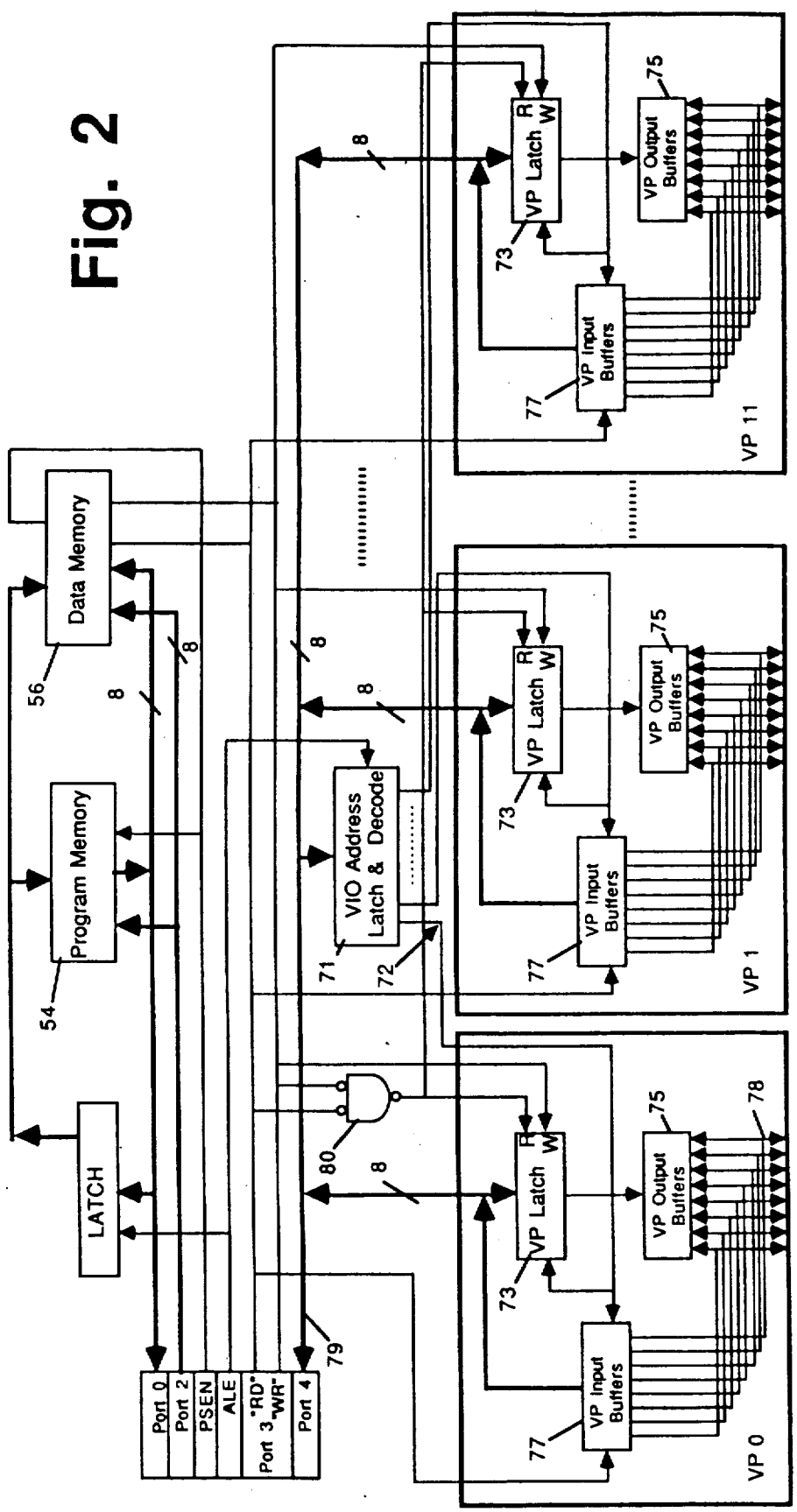
FIG. 2 is a block diagram showing an implementation of virtual I/O ports with a single chip microprocessor.

An implementation of virtual ports is shown in FIG. 2 for twelve virtual ports VP0-VP11. In the preferred embodiment, port 4 functions as the I/O bus of the microcontroller for VIO, transmitting VIO addresses and data. VIO address latch and decode logic 71 captures the virtual port address on bus 79 on the falling edge of the signal address latch enable (ALE) from timing and control logic 21. The microcontroller, based upon software instructions, generates "select" signals for individual virtual ports on bus 79. The details regarding such "select" signal generation will be described below in the discussion concerning operation of VIO. The port latch register 73 of the selected port captures data to be written from I/O bus 79 when "WR" is asserted and presents it to the port's driver 75. The port drivers are analogous to the drivers 27', 31', 29', and 33' of the internal ports. Port latch register 73 may be read on the I/O bus 79 when a read-modify-write operation is performed. In this case, both "RD" and "WR" signals are asserted, in which case gate 80 outputs a logic 1 causing latch register 73 to place its contents on bus 79. During a read operation, the input buffer 77 of the selected virtual port reads data from the pins 78 of the selected virtual port VP0-VP11. The data in buffer 77 is placed on I/O bus 79 when "RD" is asserted.

OPERATION OF VIO

When an I/O operation occurs accessing a VIO port, VIO decode, timing and control logic 61 takes control of the CPU to ensure that proper data sequences and control signals are generated. VIO decode, timing and control logic 61 is associated with one of the I/O ports on the chip, which as noted above, in the preferred embodiment is port 4. An implementation of VIO decode, timing and control logic will be described below with reference to FIG. 3.

When an instruction is executed which contains a virtual port as an operand, the following sequence of actions take place.

First, the instruction execution time is corrected, if necessary, to account for the timing requirements of a VIO instruction. If the original instruction execution time is one cycle, then it is increased to two. If the original execution time is two cycles, then it remains the same. (The 8051 has no three cycle instructions and only two four cycle instructions, namely Multiply and Divide which do not use VIO.)

Second, the address of the virtual port is transmitted over I/O bus 79 to the virtual port. VIO address latch and decode logic 71 latches this address on the falling edge of the address latch enable (ALE) signal, and decodes it, generating a select signal on one of lines 72 thereby selecting the desired virtual port input buffer 77. The address may be sent in a variety of ways. It may be sent in an encoded form, where multiple bits represent a single VIO port. In this case more virtual ports can be implemented, but the external decoding hardware becomes complex and expensive. On the other hand, the address may be sent in a decoded form, which is less complex to decode, but fewer virtual ports can be implemented. In either case, the basic operation remains the same.

In the preferred embodiment, a combination of encoded and decoded addressing scheme is used. The first eight virtual port addresses are sent in the decoded form. The next four are encoded in two adjacent bits. For example, VP0 is addressed by asserting pin 0 of I/O bus 79 (i.e., port 4), VP1 pin 1, and so on. VP8 is addressed by asserting pin 0 and pin 1 simultaneously, VP9 is addressed by asserting pin 2 and pin 3 simultaneously and so on. The addressing scheme is shown in Table 1.

TABLE 1

| I/O Bus Select Line | | | | | | | | VIO Port |
|---|---|---|---|---|---|---|---|---|
| 7 | 6 | 5 | 4 | 3 | 2 | 1 | 0 | |
| 1 | 1 | 1 | 1 | 1 | 1 | 1 | 0 | VP0 |
| 1 | 1 | 1 | 1 | 1 | 1 | 0 | 1 | VP1 |
| 1 | 1 | 1 | 1 | 1 | 0 | 1 | 1 | VP2 |
| 1 | 1 | 1 | 1 | 0 | 1 | 1 | 1 | VP3 |
| 1 | 1 | 1 | 0 | 1 | 1 | 1 | 1 | VP4 |
| 1 | 1 | 0 | 1 | 1 | 1 | 1 | 1 | VP5 |
| 1 | 0 | 1 | 1 | 1 | 1 | 1 | 1 | VP6 |
| 0 | 1 | 1 | 1 | 1 | 1 | 1 | 1 | VP7 |
| 1 | 1 | 1 | 1 | 1 | 1 | 0 | 0 | VP8 |
| 1 | 1 | 1 | 1 | 0 | 0 | 1 | 1 | VP9 |
| 1 | 1 | 0 | 0 | 1 | 1 | 1 | 1 | VP10 |
| 0 | 0 | 1 | 1 | 1 | 1 | 1 | 1 | VP11 |

Third, if a read operation is required, then VIO timing and control logic 85 asserts an external read "RD" signal. (VIO timing and control logic 85 is shown in FIG. 3 as well as the registers, encoder and decoder which comprise decode, timing and control logic 61 shown in FIG. 1.) The selected virtual port places data on I/O bus 79 and the data is latched in input data register 81 (see FIG. 3) by VIO, timing and control logic 85. The SFR address corresponding to the desired virtual port is latched by address register 83 and encoded by encoder 87 according to Table 1. The encoded virtual port address is presented to port drivers 35'. On the other hand, if a write operation is desired, then VIO, timing and control logic 85 places data on I/O bus 79 and asserts an external write "WR" signal and virtual port latch 73 of the selected virtual port latches the data. Timing diagrams for virtual port read and write operations are shown in FIGS. 4 and 5 respectively.

If a read-modify-write (RMW) operation is desired, then VIO timing and control logic 85 performs a latch read operation from the virtual port. In this operation, the data is read from latch 73 of the selected virtual port and not from the pins of the virtual port. To achieve this, VIO timing and control logic 85 asserts external read "RD" and write "WR" signals simultaneously causing gate 80 to generate a logic 1 for input to latch 73. The virtual port then places the contents of its latch 73 on I/O bus 79. The read-modify-write timings are shown in FIG. 6.

IMPLEMENTATION OF VIO

As shown in FIG. 1, VIO decode, timing and control logic 61 is easily integrated with the rest of the CPU blocks. Although the figure shows port 4 used for the VIO, any port which is not needed to access external memory, could have been used. In FIG. 1, port 1 would be the only other available port.

Figure 3:
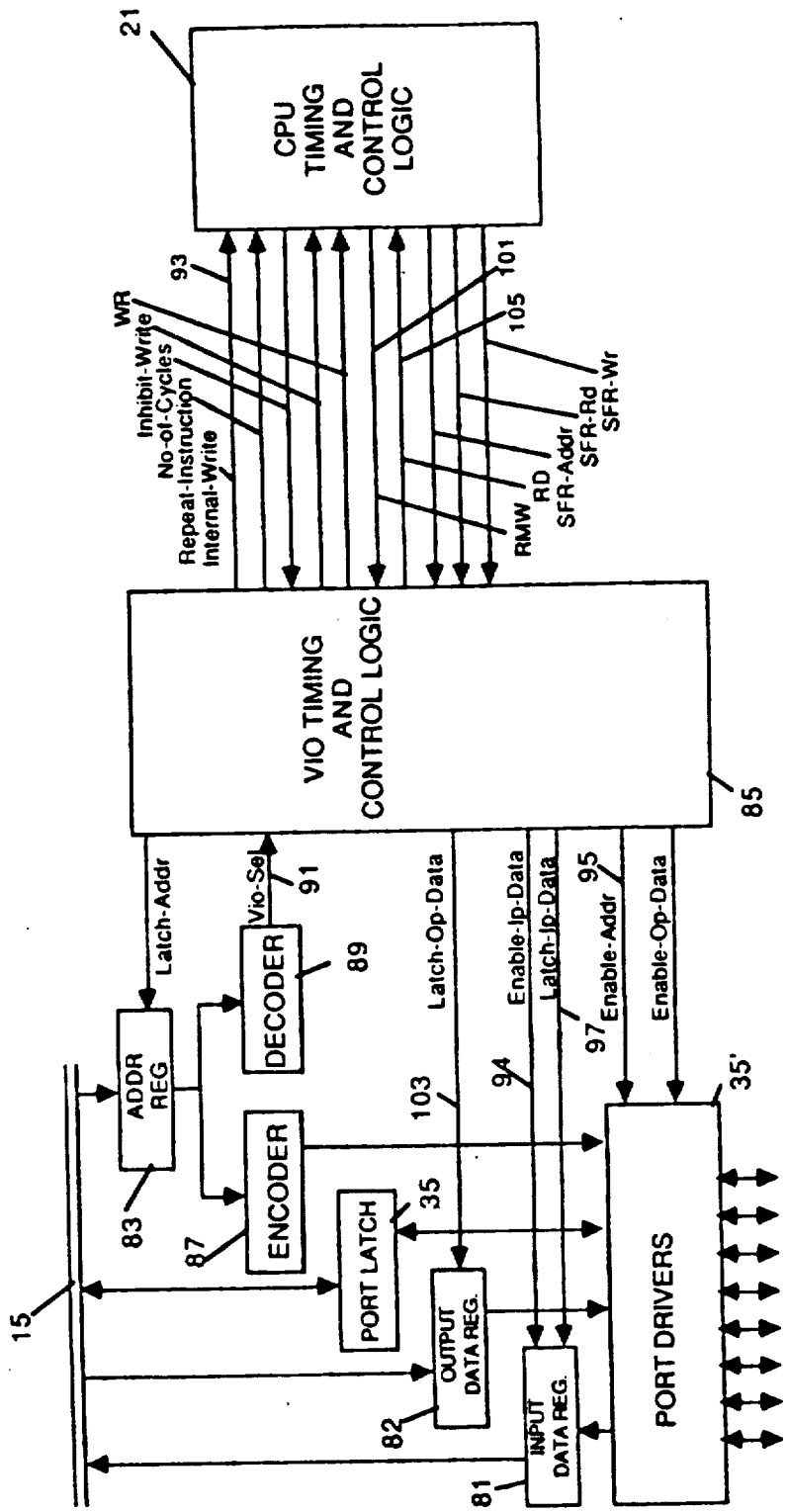
FIG. 3 is a detailed block diagram of an onboard port which can be coupled to one or more virtual ports for virtual input/output operation.

The basic building blocks of VIO decode, timing and control logic 61 comprises an input data register 81, output data register 82, address register 83, timing and control logic 85, encoder 87 and decoder 89 as shown in FIG. 3.

VIO timing and control logic 85 and the CPU timing and control logic 21 communicate using the control signals RMW, Read, Write, Inhibit-Write, No-of Cycles, Repeat-Instruction and Internal-Write as shown in FIG. 3. CPU timing and control logic 21 monitors data flow in the entire CPU, and VIO timing and control logic 85 monitors the VIO operation. VIO timing and control logic 85 may be implemented as a state machine or using discreet logic components. Logic equations which define VIO timing and control logic 85 are as follows:

The CPU timing and control logic generates the following signals (see FIG. 3):

SFR-Addr : SFR address is on the bus 15.
SFR-Rd : Read from the selected SFR.
SFR-Wr : Write into the addressed SFR.

The VIO timing and control logic 85 generates the following signals (see FIG. 3):

1) Latch the address into address register 83.
Latch-Addr = S5 AND SFR-Addr
2) Output the encoded address onto the I/O bus 79.

Enable-Addr = VIO-Sel AND S5 AND (C1 AND SFR-Rd C2 AND SFR-Wr)

OR

3) Generate RD and WR signals to assert external RD and WR signals.
RD = C1 and S6 AND VIO-Sel AND SFR-Rd
WR = C2 and S6 AND VIO-Sel AND SFR-Wr OR RD AND RMW
4) Latch data from VIO port into input data register 81.
Latch-Ip-Data = C1 and S6 AND VIO-Sel AND SFR-Rd
5) Place data from the input data register 81, onto the internal bus 15.
Enable-Ip-Data = C2 and S5 AND VIO-Sel AND SFR-Rd
6) Latch data from the bus 15, into the output data register 82.
Latch-Op-Data = C2 and S6 and VIO-Sel AND SFR-Wr
7) Place data from the output data register 82, onto the I/O bus 79.
Enable-Op-Data = C2 AND S6 AND VIO-Sel AND SFR-Wr Logic equations which define the additional functionality of CPU timing and control logic 21 necessary to communicate with VIO timing and control logic 85 are as follows:

1) To indicate to the CPU to repeat the previous instruction.
Repeat-Instruction = No-of-Cycles AND VIO-Sel
2) To force the CPU to generate an internal write signal.
Internal-Write = C2 and S5 AND VIO-Sel
3) To inhibit write operation in the CPU while VIO is active.
Inhibit-Write = C1 AND VIO-Sel
4) Generate external RD, WR signals.
External-RD = CPU-RD OR RD
External-WR = CPU-WR OR WR
5) To inhibit Program counter from incrementing.
Inhibit-PC-Increment = Repeat-Instruction
6) Inhibit loading of the Instruction Register.
Inhibit-IR-loading = Repeat-Instruction.
7) The following two signals are generated by decoding the instruction.
RMW = (Arithmetic-Instruction OR Logical OR MOV) AND (Source = Destination)
No-of-Cycles = Complex combination of the opcodes.

The signals Inhibit-PC-Increment, Inhibit-IR-Loading, CPU-RD, CPU-WR, Arithmetic-Instruction, Logical, MOV, Source and Destination which are not shown in the figures as well as No-of-Cycles are signals generated or used by CPU timing and control logic 21. The details concerning the generation and use of such signals is well within the skill of persons skilled in the relevant art.

Address register 83 latches the SFR address present on internal bus 15. This address is decoded by decoder 89 to check whether it matches a virtual I/O address. If there is no match, then VIO is not activated. On the other hand, if there is a match, then decoder 89 signals VIO timing and control logic 85 by asserting the signal Vio-Sel on line 91.

When Vio-Sel is asserted, VIO timing and control logic 85 asserts the signal Repeat-Instruction to CPU timing and control logic 21 on line 93 which instructs CPU control logic 21 to extend instruction execution of one cycle instructions to two cycles for the VIO.

The latched address is encoded by encoder logic 87 and presented to port driver 35'. VIO timing and control logic 85 asserts an Enable-Addr signal on line 95. This signal causes port driver 35' to transmit the encoded address on I/O bus 79.

The Read and Write signals from VIO timing and control logic 85 to CPU control logic 21 force the CPU to generate external "RD" and "WR" signals respectively.

If the instruction is attempting to read a virtual I/O port, VIO timing and control logic 85 asserts the Read signal on line 105. CPU control logic 21 then asserts the external "RD" signal. The selected external virtual port VP0-VP11 then places data on I/O bus 79. VIO timing and control logic 85 asserts a Latch-Ip-Data signal on line 97 to capture the data in input data register 81. This data is not available until state 1 of the next cycle which is too late since the CPU expects data in state 5 of the current cycle. However, as noted above, the instruction execution has been extended by an additional cycle. Thus in state 5 of the next cycle, VIO timing and control logic 85 asserts the Enable-Ip-Data signal on line 94 to place this data on internal bus 15. The CPU latches the data in temporary register 47 for arithmetic/logic operation by ALU 11.

If the VIO instruction is a read-modify-write instruction, then CPU timing and control logic 21 asserts the RMW signal on line 101. VIO timing and control logic 85 asserts the "RD" and "WR" signals simultaneously so that the external virtual ports are informed.

In a write operation, the CPU places data on internal bus 15. VIO timing and control logic 85 latches this data in output data register 82 by asserting the Latch-Op-Data" signal on line 103. Output driver 35' then outputs the data for one and half state. This gives sufficient time for the virtual ports to capture it.

I claim:

1. A microprocessor system including a microprocessor formed as a single integrated circuit, having bus means (15) for transferring data to and from internal registers, timing and control means (21) for controlling input and output operations, said system comprising:

a plurality of input/output port means (27, 27', 29, 29', 31, 31', 35, 35') onboard said microprocessor for receiving and sending data and control signals to and from devices external to the microprocessor, each of said port means including a port latch (27, 29, 31, 35) coupled to said bus means (15), a port driver (27', 29', 31' 35') coupled to said port latch and input/output pins coupled to said port driver, said input/output pins for coupling said microprocessor to devices external to the microprocessor;

control means (85) onboard said microprocessor and coupled to a predetermined one of said plurality of port means for generating control signals for use by said timing and control means (21) to modify the timing of the execution of predetermined instructions performed by said microprocessor;

transfer means (81, 82, 83) onboard said microprocessor coupled to said bus means, said predetermined one of said port means and said control means (85) for transferring data to and from said bus means (15) and said predetermined one of said port means;

a plurality of virtual port means (73, 77, 75, 78) for coupling to said input/output pins of said predetermined one of said port means, each of said virtual port means for coupling to a device external to said microprocessor; and virtual address decoder means (71) for coupling to said input/output pins of said predetermined one of said port means and each of said virtual port means for decoding data on said input/output pins for selecting which one of said plurality of virtual port means is to transfer data to or receive data from said input/output pins.

2. The system defined by claim 1 wherein said transfer means comprises:

an address register (83) coupled to said bus means (15) and said control means (85);

encoder means (87) coupled to said address register and said port driver (35') of said predetermined one of said port means for encoding an address in said address register to a corresponding one of said virtual port means;

decoder means (89) coupled to said address register and said control means (85) for generating a signal for informing said control means when said address register has been loaded with a virtual port address from said bus means (15);

output data register means (82) coupled to said bus means, said predetermined one of said port means and said control means (85) for latching data from said bus means (15) to be output to a selected one of said virtual port means as determined by said signal generated by said decoder means (89); and input data register means (81) coupled to said bus means, said predetermined one of said port means and said control means for latching data from a selected one of said virtual port means for transfer to said bus means.

3. The system defined by claim 1 wherein each of said virtual port means comprises:

a virtual port latch (73) coupled to said input/output pins of said predetermined one of said port means;

a virtual port input buffer (77) coupled to said input/output pins and a plurality of virtual port pine (78); and a virtual port output buffer (75) coupled to said virtual port latch and said virtual port pins.

4. The system defined by claim 1 wherein said virtual address decoder means comprises:

a virtual address latch (71) coupled to said input/output pins of said predetermined one of said port means for storing a virtual address placed on said input/output pins by operation of said microprocessor; and a decode logic circuit (71) coupled to said virtual address latch for decoding said virtual address stored in said latch to determine which of said virtual port means is being addressed by said microprocessor.

5. The system defined by claim 4 further comprising a logic gate (80) coupled to lines on which external read and external write signals generated by said microprocessor are placed, and to each of said virtual port latches, for generating a logic signal causing a selected one of said virtual port latches to place its contents onto said input/output pins of said predetermined one of said port means.

* * * * *

UNITED STATES PATENT AND TRADEMARK OFFICE
CERTIFICATE OF CORRECTION

PATENT NO. : 5,047,922
DATED : 9/10/91
INVENTOR(S) : Borkar

It is certified that error appears in the above-identified patent and that said Letters Patent is hereby corrected as shown below:

| | | |
|---|---|---|
| col. 07, line 36 | delete "and" | insert --AND-- |
| col. 07, line 40 | delete "and" | insert --AND-- |
| col. 07, line 44 | delete "and" (both occurrences) | insert --AND-- |
| col. 07, line 59 | delete "and" | insert --AND-- |
| col. 10, line 22 | delete "pine" | insert --pins-- |

Signed and Sealed this

Twenty-fifth Day of May, 1993

Attest:

*Attesting Officer*

MICHAEL K. KIRK

*Acting Commissioner of Patents and Trademarks*